United States Patent
Kemmler

(10) Patent No.: US 10,646,926 B2
(45) Date of Patent: May 12, 2020

(54) CUTTING INSERT, TOOL HOLDER, AND TOOL FOR MACHINING A WORKPIECE

(71) Applicant: Hartmetall-Werkzeugfabrik Paul Horn GmbH, Tuebingen (DE)

(72) Inventor: Tobias Kemmler, Pliezhausen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 16/113,428

(22) Filed: Aug. 27, 2018

(65) Prior Publication Data

US 2018/0361486 A1   Dec. 20, 2018

Related U.S. Application Data

(63) Continuation of application No. PCT/EP2017/052147, filed on Feb. 1, 2017.

(30) Foreign Application Priority Data

Feb. 29, 2016  (DE) .......................... 10 2016 103 565

(51) Int. Cl.
  *B23B 27/16* (2006.01)
  *B23B 27/08* (2006.01)

(52) U.S. Cl.
  CPC .......... *B23B 27/1622* (2013.01); *B23B 27/08* (2013.01); *B23B 2200/0428* (2013.01);
  (Continued)

(58) Field of Classification Search
  CPC .......... B23B 2200/161; B23B 2205/10; B23B 2205/12; B23B 27/1622; B23C 2200/161; B23C 2200/362; B23C 5/2221
  See application file for complete search history.

(56) References Cited

U.S. PATENT DOCUMENTS

| | | |
|---|---|---|
| 7,094,006 B2 | 8/2006 | Hecht |
| 7,419,337 B2 | 9/2008 | Berminge |

(Continued)

FOREIGN PATENT DOCUMENTS

| | | | |
|---|---|---|---|
| CH | 686935 A5 * | 8/1996 | ............ B23B 27/08 |
| CH | 686935 A5 | 8/1996 | |

(Continued)

OTHER PUBLICATIONS

English translation of EP 1470878 A1, Oct. 2004 (Year: 2004).*

(Continued)

*Primary Examiner* — Alan Snyder
(74) *Attorney, Agent, or Firm* — Jason H. Vick; Sheridan Ross, PC

(57) ABSTRACT

A cutting insert for a tool for machining a workpiece, comprising a first cutting edge and a first cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the cutting insert has a laterally protruding elevation, which is arranged on a side of the cutting insert that is oriented transversely to the first bore axis, and wherein on the elevation are arranged a first lateral holder contact surface, an axial holder contact surface and a first horizontal holder contact surface for the bearing contact of the cutting insert against a tool holder, wherein the first lateral holder contact surface runs substantially orthogonally to the first bore axis, and wherein the axial holder contact surface and the first horizontal holder contact surface run substantially orthogonally to the first lateral holder contact surface and transversely to each other.

19 Claims, 4 Drawing Sheets

(52) U.S. Cl.
CPC ... *B23B 2200/121* (2013.01); *B23B 2200/369* (2013.01); *B23B 2205/10* (2013.01); *B23B 2205/12* (2013.01)

(56) References Cited

U.S. PATENT DOCUMENTS

| | | | |
|---|---|---|---|
| 7,510,354 B2 | 3/2009 | Andersson et al. | |
| 8,529,166 B2 | 9/2013 | Hecht | |
| 9,339,873 B2 | 5/2016 | Hecht | |
| 9,457,410 B2 | 10/2016 | Tornstrom | |
| 2008/0240873 A1* | 10/2008 | Furuki | B23B 27/04 407/107 |
| 2011/0110733 A1 | 5/2011 | Hecht | |
| 2016/0288225 A1 | 10/2016 | Lee et al. | |

FOREIGN PATENT DOCUMENTS

| | | | |
|---|---|---|---|
| CH | 693021 A5 | 1/2003 | |
| CH | 695481 A5 | 6/2006 | |
| CN | 1638899 A | 7/2005 | |
| CN | 101171096 | 4/2008 | |
| CN | 102596458 A | 7/2012 | |
| CN | 103801723 A | 5/2014 | |
| DE | 20308159 U1 | 7/2003 | |
| DE | 102006017458 A1 | 9/2007 | |
| EP | 0517156 A1 | 12/1992 | |
| EP | 1240961 | 9/2002 | |
| EP | 1189719 B1 | 4/2003 | |
| EP | 1375038 A1 | 1/2004 | |
| EP | 1368149 B1 | 5/2004 | |
| EP | 1470878 A1 * | 10/2004 | B23B 27/08 |
| EP | 1470878 A1 | 10/2004 | |
| EP | 1657012 A1 | 5/2006 | |
| EP | 1617963 B1 | 4/2012 | |
| JP | 06-155110 A | 6/1994 | |
| JP | H 09-57517 A | 3/1997 | |
| JP | 2006-167818 A | 6/2006 | |
| JP | 2009-534199 | 9/2009 | |
| JP | 3163600 U | 9/2010 | |
| JP | 2013-510011 A | 3/2013 | |
| JP | 2016-540654 A | 12/2016 | |
| SU | 374120 A1 | 3/1973 | |
| SU | 462662 A1 | 3/1975 | |
| SU | 1463397 A1 | 3/1989 | |
| WO | WO 2011/031754 | 3/2011 | |

OTHER PUBLICATIONS

International Preliminary Report on Patentability for International Application No. PCT/EP2017/052147, dated Sep. 13, 2018.
International Search Report for International Application No. PCT/EP2017/052147, dated May 17, 2017.
Written Opinion for International Application No. PCT/EP2017/052147, dated May 17, 2017.
Office Action for corresponding Chinese Patent Application No. 201780014118.1, dated Jun. 20, 2019.
Decision to Grant a Patent for an Invention for corresponding Russian Patent Application No. 2018133608/02(055202), dated Jun. 21, 2019.
Notification of Reason for Rejection (Including Translation) for corresponding Japanese Patent Application No. 2018-545350, dated Oct. 1, 2019.

* cited by examiner

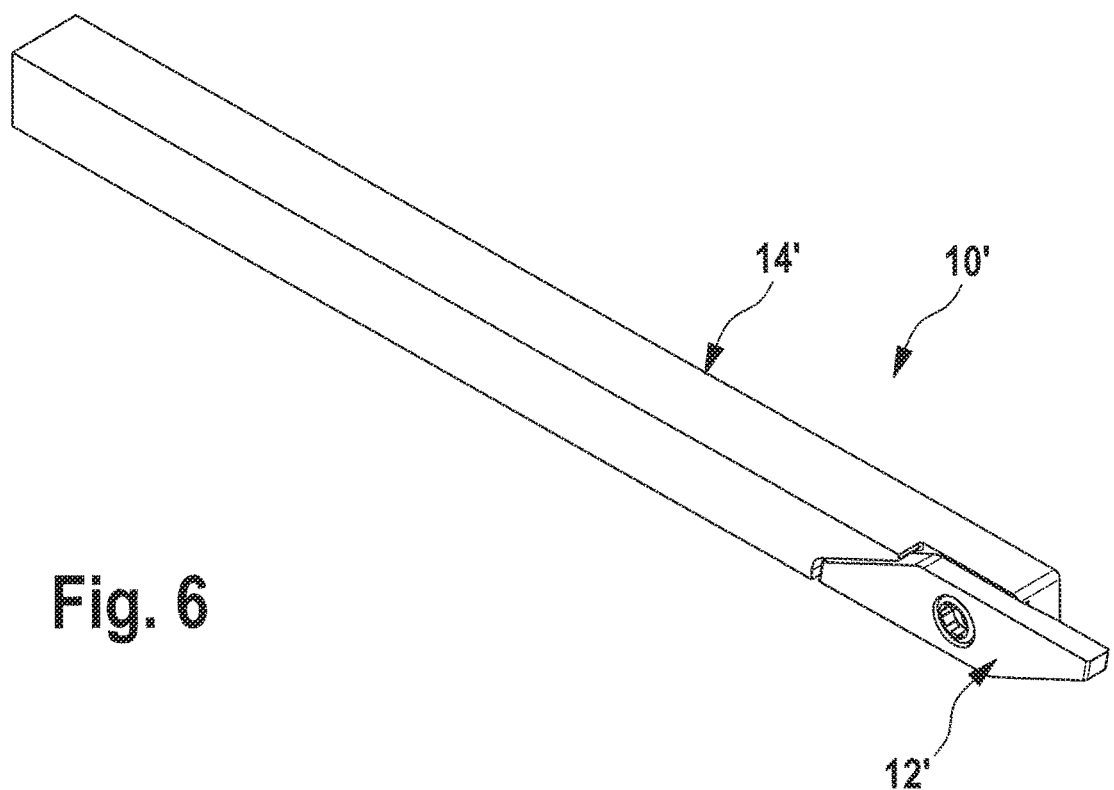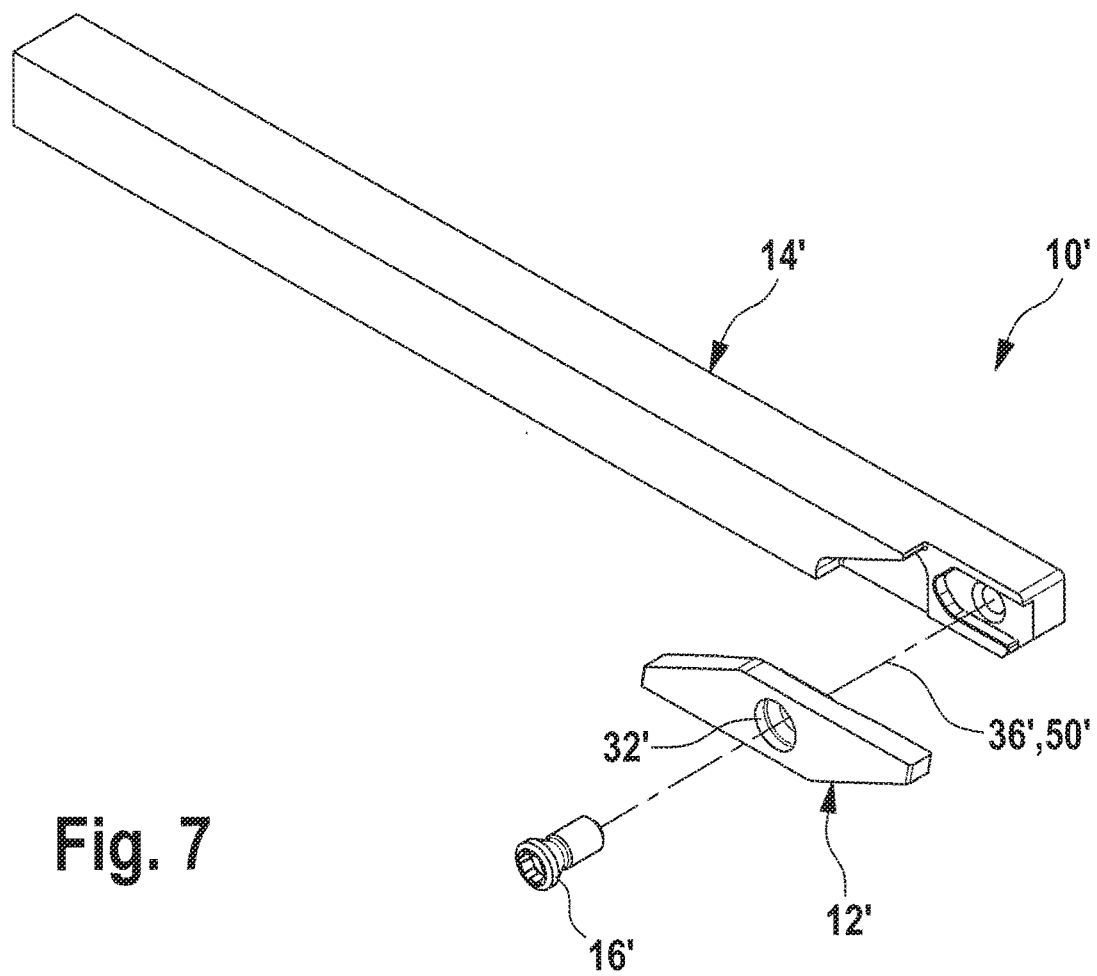

CUTTING INSERT, TOOL HOLDER, AND TOOL FOR MACHINING A WORKPIECE

CROSS REFERENCE TO RELATED APPLICATIONS

This application is a continuation of international patent application PCT/EP2017/052147, filed on Feb. 1, 2017 designating the U.S., which international patent application has been published in German language and claims priority from German patent application DE 10 2016 103 565.3, filed on Feb. 29, 2016. The entire contents of these priority applications are incorporated herein by reference.

BACKGROUND OF THE INVENTION

This disclosure relates to a cutting insert, a tool holder, and a tool comprising said cutting insert and said tool holder. The tool is a tool for machining a workpiece. More precisely, it is preferably a turning tool comprising a tool holder and a cutting insert which can be exchangeably fixed to the tool holder. The cutting insert can be fastened to the tool holder with the aid of one or more fastening elements.

Turning tools comprising exchangeable indexable inserts are already known in a variety of different designs. An example of turning tools of this type are long-turning tools, which are used in so-called long-turning lathes or long-turning automatic screw machines.

Traditional long-turning lathes are controlled mechanically via preset cams. Modern long-turning lathes are controlled by means of CNC technology via computers. For these modern, computer-controlled long-turning lathes, a variety of turning tools with exchangeable indexable insert exists.

The traditional, cam-controlled long-turning lathes are likewise still very widespread, however, and continue to be used in practice. For instance, in the manufacture of very small or precision parts, as are required in the watchmaking industry, cam-controlled long-turning lathes continue to be employed. However, the number of tools which are suitable for this is rather limited. This is mainly due to the fact that, for applications of this type, very small dimensions of the tool shank are necessary. As a rule, tool holders having a cross-sectional size of maximally 6×6 mm are suitable for the purpose. This, in turn, places particular requirements on the interface between tool holder and cutting insert, and on the overall stability of the tool. Moreover, in the production of very small, precision components, as are used in the watchmaking industry, an exact, repeatable accuracy in respect of the tools is crucial. To be able to ensure this in combination with the relatively small dimensions which are to be obtained and with a still guaranteeable mechanical stability of the tool is a major challenge from a design aspect.

Examples of turning tools which can be manufactured with very small dimensions and are suitable in the production of miniature parts for the watchmaking industry are known from EP 1 617 963 B1, EP 1 368 149 B1 and from EP 1 189 719 B1.

In these tool examples, the interface between cutting insert and tool holder comprises a ribbed structure, on which the cutting insert and the tool holder touch. This type of interface has several drawbacks, however, with regard to stability and precision. On the one hand, the forces which act in the axial direction or longitudinal direction of the tool are diverted into the tool holder via the screws by which the cutting insert is fastened to the tool holder. This results in a relatively high load upon the screws and a lower positioning accuracy. Furthermore, the ribbed structure is mostly arranged as a sintered and non-reground, i.e. 'as sintered' structure, which, in turn, adversely affects the positioning accuracy.

SUMMARY OF THE INVENTION

It is an object to provide a cutting insert and a tool of the abovementioned type, which meet the abovementioned requirements and overcome the abovementioned drawbacks. In this context, it is in particular an object to improve the interface between cutting insert and tool holder with regard to stability and precision, so that the tool is particularly well suited to the manufacture of precision miniature parts, as are required, for instance, in the watchmaking industry.

According to a first aspect, a cutting insert for a tool for machining a workpiece is presented, wherein the cutting insert comprises a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, a second lateral holder contact surface, an axial holder contact surface and a first horizontal holder contact surface, for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis and at least partially surrounds the first cutting insert bore, and wherein the second lateral holder contact surface lies in a same plane with the first lateral holder contact surface, is distanced from the first lateral holder contact surface in the cutting insert longitudinal direction and at least partially surrounds the second cutting insert bore, and wherein the axial holder contact surface and the first horizontal holder contact surface run substantially orthogonally to the first lateral holder contact surface and transversely to each other.

According to a second aspect, a tool for machining a workpiece is presented, which comprises:

a cutting insert having a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, a second lateral holder contact surface, an axial holder contact surface and a first horizontal holder contact surface, for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis and at least partially surrounds the first cutting insert bore, and wherein the second lateral holder contact surface lies in a same plane with the first lateral holder contact surface, is distanced from the first lateral holder contact surface in the cutting insert longitudinal direction and at least partially surrounds the second cutting insert bore, and wherein the axial holder contact surface and the first horizontal holder contact surface run substantially orthogonally to the first lateral holder contact surface and transversely to each other;

the tool holder comprising a cutting insert receiving fixture for receiving the cutting insert;

a first screw inserted through the first cutting insert bore into the tool holder; and a second screw inserted through the second cutting insert bore into the tool holder.

According to a third aspect, a cutting insert for a tool for machining a workpiece is presented, wherein the cutting insert comprises a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, an axial holder contact surface, a first horizontal holder contact surface and a second horizontal holder contact surface for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis, wherein the axial holder contact surface and the first horizontal holder contact surface run substantially orthogonally to the first lateral holder contact surface and transversely to each other, wherein the second horizontal holder contact surface is distanced from the first horizontal holder contact surface in the cutting insert longitudinal direction, and wherein a first distance, measured in the cutting insert longitudinal direction, between the first horizontal holder contact surface and the second horizontal holder contact surface is greater than a second distance, measured in the cutting insert longitudinal direction, between the first bore axis and the second bore axis.

According to a fourth aspect, a tool for machining a workpiece is presented, which comprises:

a cutting insert having a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, an axial holder contact surface, a first horizontal holder contact surface and a second horizontal holder contact surface for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis, wherein the axial holder contact surface and the first horizontal holder contact surface run substantially orthogonally to the first lateral holder contact surface and transversely to each other, wherein the second horizontal holder contact surface is distanced from the first horizontal holder contact surface in the cutting insert longitudinal direction, and wherein a first distance, measured in the cutting insert longitudinal direction, between the first horizontal holder contact surface and the second horizontal holder contact surface is greater than a second distance, measured in the cutting insert longitudinal direction, between the first bore axis and the second bore axis;

the tool holder comprising a cutting insert receiving fixture for receiving the cutting insert;

a first screw inserted through the first cutting insert bore into the tool holder; and a second screw inserted through the second cutting insert bore into the tool holder.

According to this disclosure, the term "substantially orthogonally" is preferably, but not absolutely necessarily understood exactly orthogonally. However, minor deviations from an exact 90° angle, which are within the range of ±3°, should also fall under this term.

The term "transversely" is understood in this disclosure as a non-parallel orientation, thus an angle unequal to 0°. The term "transversely" includes orthogonally, but is not limited to this meaning.

The terms "first", "second" and "third" which are placed in front of the terms "cutting edge", "cutting insert bore", "bore axis", "lateral holder contact surface" and "horizontal holder contact surface" are in the present case used merely for the conceptual differentiation of individual features with same designation, yet are not intended to imply any priority, order or other significance whatsoever.

The presented cutting insert comprises on a side face that is oriented transversely to the first bore axis a preferably elongate elevation, which extends substantially along the cutting insert longitudinal direction. On this elevation are arranged all contact surfaces with which the cutting insert touches the tool holder. These contact surfaces are in the present case generally referred to as the holder contact surfaces.

According to the disclosure, on said elevation are arranged at least one lateral holder contact surface, an axial holder contact surface and a horizontal holder contact surface. The lateral holder contact surface runs preferably parallel to the cutting insert longitudinal direction and orthogonally to the first bore axis. The axial and the horizontal holder contact surface run preferably orthogonally to the lateral holder contact surface, wherein the horizontal holder contact surface runs preferably parallel to the cutting insert longitudinal direction, and the axial holder contact surface with the horizontal holder contact surface preferably form between them an acute angle, particularly preferably an angle of 45°.

As a result of the arrangement of at least three contact surfaces on the elevation, which protrudes from one side of the cutting insert, the cutting insert can be supported in all three spatial directions solely with the aid of this elevation.

The fastening means for fastening the cutting insert to the tool holder can thereby be relieved of load. A more stable and more precise insert seat is hereby obtained. In addition, through this type of realization of the contact surfaces, a very compact construction of the tool can be obtained, wherein the cutting insert, even given very small dimensions of the tool holder, the cutting insert, in comparison thereto, can still be constructed with relatively large dimensions. This is in particular made possible by the fact that, due to the contact surfaces provided on the elevation of the cutting insert and, correspondingly thereto in the recess of the tool holder, the tool holder no longer has to surround the cutting insert. The cutting insert can therefore have a cutting insert height which differs by less than 5% from a tool holder height of the tool holder, wherein said cutting insert height is measured orthogonally to the first bore axis and orthogonally to the cutting insert longitudinal direction, and wherein said tool holder height is measured orthogonally to the third bore axis and orthogonally to the holder longitudinal direction. In total, a tool having a cross section of 6×6 mm or less is able to be realized.

According to a refinement, the first lateral holder contact surface at least partially, preferably completely, surrounds the first cutting insert bore. In addition, preferably the first lateral holder contact surface borders the first cutting insert bore. Further preferably, the second lateral holder contact surface borders the second cutting insert bore.

According to a further refinement, the first lateral holder contact surface and/or the second lateral holder contact surface is a ground surface. By contrast, the axial holder contact surface and the first horizontal holder contact surface are preferably arranged as 'as sintered' surfaces.

By an "as sintered" surface is understood a surface which, in a sintered component, does not undergo additional finishing by grinding.

The present disclosure thus enables a very exact and stable bearing contact of the cutting insert against the tool holder, despite the fact that a large part of the contact surfaces which are provided on the cutting insert is unground, 'as sintered' contact surfaces. This, in turn, yields an enormous cost benefit due to the minimized grinding requirement during production. The at least one ground, lateral holder contact surface enables an extensive, stable and precise bearing contact of the cutting insert against the tool holder. Since the at least one cutting edge of the cutting insert is ground in a grinding holder having the same interfaces as that of the tool holder according to the disclosure, a highly precise horizontal and axial positioning of the cutting insert is additionally successfully achieved despite the 'as sintered' surfaces.

According to a further refinement, the cutting insert has a total width, measured parallel to the first bore axis, which is less than the sum of a width, measured parallel to the first bore axis, of the first cutting edge and a height, measured parallel to the first bore axis, of the elevation.

In other words, the main body of the cutting insert, on one side of which the elevation is arranged and at one end of which, viewed in the cutting insert longitudinal direction, the first cutting edge is arranged, is configured wider in the region of the first cutting edge than in that middle region of the main body on which the elevation is arranged. The elevation can thereby be constructed taller, while the total width of the cutting insert remains the same. This, in turn, enables larger contact surfaces which are arranged on the elevation. Thus a more stable interface is able to be realized and a comparatively lower surface pressure materializes at the interface between cutting insert and tool holder during use of the tool.

The division of the lateral holder contact surface into a first and a, there-from separated, second lateral holder contact surface enables a further increase in the stability and precision of the insert seat. The second lateral holder contact surface, like the first lateral holder contact surface, is preferably a ground surface. It preferably directly borders the second cutting insert bore.

According to a further refinement, on the elevation there is further arranged a second horizontal holder contact surface, which is distanced from the first horizontal holder contact surface in the cutting insert longitudinal direction.

According to this refinement, a total of five contact surfaces, namely one axial holder contact surface, two lateral holder contact surfaces and two horizontal holder contact surfaces, thus exist on the elevation. This enables the stability and precision of the insert seat to be further increased. The second horizontal holder contact surface, like the first horizontal holder contact surface, is preferably provided as an 'as sintered' surface.

Preferably, the second horizontal holder contact surface lies in the same plane with the first horizontal holder contact surface. Both horizontal holder contact surfaces run preferably substantially parallel to the cutting insert longitudinal direction. In practice, however, these are not exactly parallel to each other and to the cutting insert longitudinal direction, since they are unable to be produced, 'as sintered', exactly horizontally.

According to a refinement, the two horizontal holder contact surfaces are therefore inclined by 0.5° relative to the cutting insert longitudinal direction. The production tolerance is within the range +/−0.5°. The surfaces can thereby vary between 0° and 1° in absolute terms. However, the surfaces should only be inclined such that the distance between the two horizontal contact surfaces as a result of the inclination is not less than, but only greater than compared to exactly horizontal surfaces.

In the last-named refinement, it is further preferred that a first distance, measured in the cutting insert longitudinal direction, between the first and second horizontal holder contact surface is greater than a second distance, measured in the cutting insert longitudinal direction, between the first and second bore axis.

The horizontal holder contact surfaces act respectively as a mount, which, during the use of the tool, absorbs forces acting in the vertical direction. Because the distance between the two horizontal holder contact surfaces, and hence the bearing spacing (first distance), is greater than the distance apart of the two bores (second distance), a tilting of the cutting insert about a transverse axis parallel to the bore axes already during tightening of the fastening screws is effectively prevented.

According to a further refinement, the first horizontal holder contact surface borders at a first end a first convexly shaped surface arranged on the elevation, and at an opposite second end, viewed in the cutting insert longitudinal direction, a second convexly shaped surface arranged on the elevation. Similarly, also the second horizontal holder contact surface, at its two ends lying opposite each other in the cutting insert longitudinal direction, respectively borders a convexly shaped surface.

As a result, an exactly defined horizontal support of the cutting insert on the tool holder is obtained. The corresponding horizontal cutting insert contact surface provided in the recess of the cutting insert receiving fixture on the tool holder is preferably formed by just one continuous, planar surface.

According to a further refinement, on the elevation there is further provided a concavely shaped surface, which is arranged, in the cutting insert longitudinal direction, between the first and the second horizontal holder contact surface. This concavely shaped surface does not touch the tool holder in the assembled state of the tool. It is arranged between the two abovementioned horizontal mounts.

According to a further refinement, a width, measured orthogonally to the first bore axis and orthogonally to the cutting insert longitudinal direction, of the elevation is less than a total height, measured parallel to the width of the elevation, of the cutting insert. The elevation thus does not extend over the total height of the cutting insert, but preferably only over a large part of the total height of the cutting insert. The elevation is preferably arranged in the center or middle of the cutting insert, so that a 180° rotational symmetry is obtained.

According to a further refinement, the cutting insert comprises not just one cutting edge, but two cutting edges, namely a first and a second cutting edge. In this case, the cutting insert is preferably 180° rotationally symmetrical about a transverse axis which runs parallel to the first bore axis.

By a 180° rotational symmetry is understood a symmetry property in which the body, when rotated through 180° about an axis (here the transverse axis), is mapped onto itself. In case of wear to the first cutting edge, the cutting insert is thus able to be released from the tool holder, rotated through 180°, and then refastened to the tool holder, so that the second cutting edge can then continue to be used.

The abovementioned refinements relate in particular to the cutting insert. It is to be understood, however, that some of said features can also be provided correspondingly or accordingly thereto on the tool holder.

It is to be understood that the features mentioned above and the features yet to be explained hereunder are capable to be used not only in the combination stated in each case, but can likewise be used in other combinations or individually, without departing from the spirit and scope of the present disclosure.

BRIEF DESCRIPTION OF THE DRAWINGS

FIG. 6 shows a perspective view of a second embodiment of the tool;

FIG. 7 shows an exploded representation of the second embodiment of the tool;

DESCRIPTION OF PREFERRED EMBODIMENTS

Figure 1:
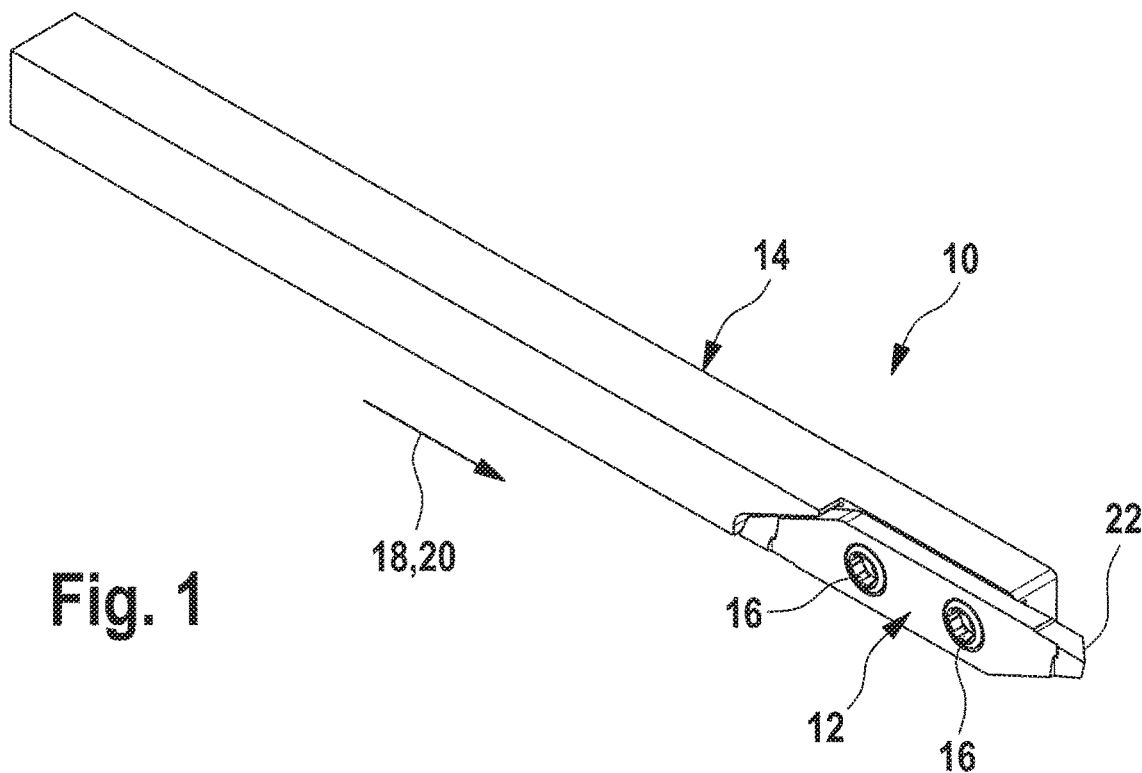
FIG. 1 shows a perspective view of a first embodiment of the tool.
Figure 2:
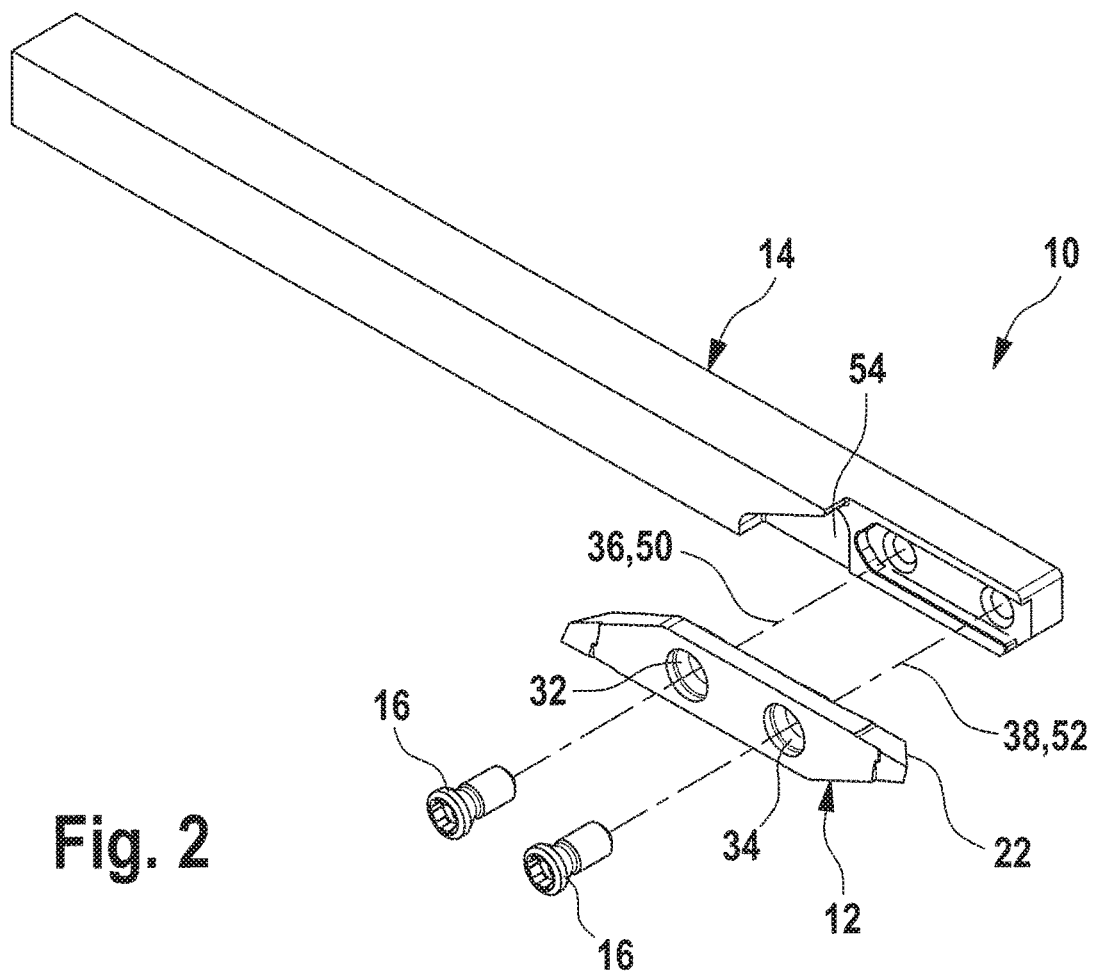
FIG. 2 shows an exploded representation of the first embodiment of the tool.

FIG. 1-5 show various views of an embodiment of the tool according to the invention, of the tool holder according to the invention, and of the cutting insert according to the invention. The tool is therein denoted in its entirety by the reference numeral 10. The cutting insert is denoted by the reference numeral 12. The tool holder is denoted by the reference numeral 14.

The tool 10 is a so-called long-turning tool. The cutting insert 12 is exchangeably attached to the tool holder 14 with the aid of fastening means 16. The fastening means 16 are preferably realized in the form of one or more screws. In case of wear, the cutting insert 12 can therefore be replaced by a new cutting insert of the same type. The cutting insert 12 is preferably made of carbide. The tool holder 14 is preferably made of steel.

Both the cutting insert 12 and the tool holder 14 have an elongate shape. The cutting insert 12 extends substantially along a cutting insert longitudinal direction 18 (in FIG. 5 indicated with arrow 18). The tool holder 4 extends substantially along a holder longitudinal direction 20 (in FIG. 3 indicated with arrow 20). In the assembled state of the tool 10, the cutting insert longitudinal direction 18 and the holder longitudinal direction 20 coincide or run parallel to each other (cf. FIG. 1).

The cutting insert 12 is preferably configured as an indexable insert. It preferably comprises two cutting edges: a first cutting edge 22 and a second cutting edge 22'. The cutting insert 12 is 180° rotationally symmetrical about a transverse axis 24 (cf. FIG. 5). It is hence able to be used in two different positions on the tool holder 14, so that both the first cutting edge 22 and the second cutting edge 22' can be used, one after the other. It is to be understood, however, that the cutting insert 12 does not necessarily have to be a double-edged indexable insert of this type. In principle, a single-edged cutting insert 12 would also be conceivable, without departing from the scope of the present invention.

The cutting insert 12 has a main body 26, at the (in the cutting insert longitudinal direction 18) opposite ends of which are arranged the cutting edges 22 and 22'. On one side 28 of the main body 26, the cutting insert 12 comprises an elevation 30. This elevation 30 protrudes laterally from the main body 26 and is integrally connected thereto. The elevation 30 has a substantially elongate shape and extends along the side 28 of the main body 26 substantially parallel to the cutting insert longitudinal direction 18.

According to the first embodiment shown in FIGS. 1-5, the cutting insert 12 comprises two bores 32, 34. These bores are in the present case referred to as a first cutting insert bore 32 and a second cutting insert bore 34. The first cutting insert bore 32 extends along a first bore axis 36. The second cutting insert bore 34 extends along a second bore axis 38. The first bore axis 36 and the second bore axis 38 run parallel to each other, as well as parallel to the transverse axis 24 and orthogonally to the longitudinal direction or longitudinal axis 18 of the cutting insert 12.

Figure 3:
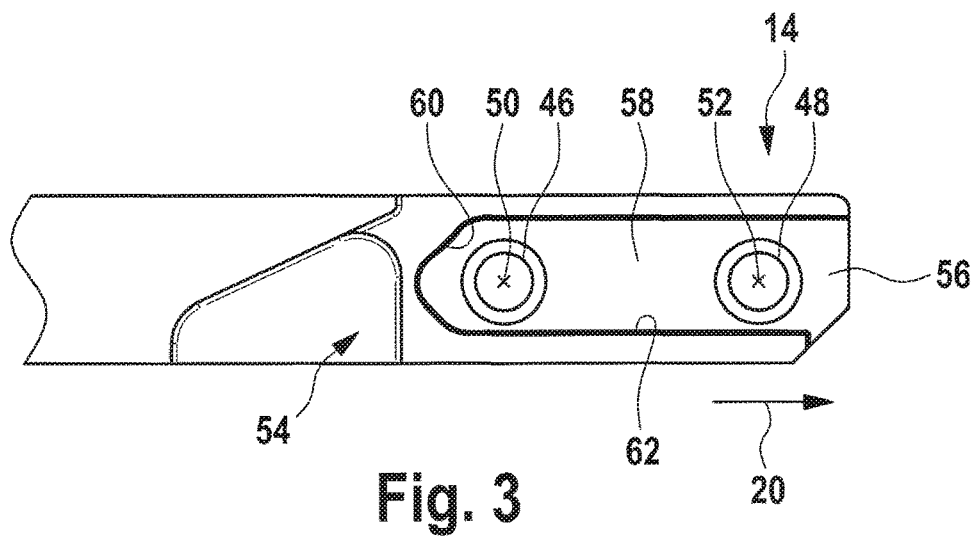
FIG. 3 shows a side view of a front end of a tool holder according to the first embodiment of the tool.

As can be seen, in particular, from FIG. 3, the elevation 30 does not extend over the total height, nor over the total length of the cutting insert 12, but respectively only over a part of the height and length of the cutting insert 12, wherein by "the length of the cutting insert 12" is understood the dimension measured parallel to the cutting insert longitudinal direction 18, and wherein by "the height of the cutting insert 12" is understood the dimension measured orthogonally to the cutting insert longitudinal direction 18 and orthogonally to the first bore axis 36.

The cutting insert 12 further comprises a plurality of contact surfaces 40, 42, 44, with which the cutting insert 12, in the assembled state of the tool 10, bears against the tool holder 14. These contact surfaces 40, 42, 44 are all arranged on the elevation 30. Preferably, the cutting insert 12 makes contact with the tool holder 14, in the assembled state of the tool 10, only with these contact surfaces 40, 42, 44. The elevation 30 thus forms, on the part of the cutting insert 12, the interface for the connection between cutting insert 12 and tool holder 14.

According to the first embodiment shown in FIGS. 1-5, the cutting insert 12 bears with a total of five contact surfaces 40 42, 44 against the holder 14. Two of these five contact surfaces are in the present case referred to as the first and the second lateral holder contact surface 40a, 40b. A further one of these five contact surfaces is in the present case referred to as the axial holder contact surface 42. The last two of the five contact surfaces are in the present case referred to as the first and second horizontal holder contact surfaces 44a, 44b.

The first lateral holder contact surface 40a and the second lateral holder contact surface 40b are arranged on the end face of the elevation 30. These run orthogonally to the transverse axis 24, and hence also orthogonally to the bore axes 36, 38. The two lateral holder contact surfaces 40a and 40b lie preferably in the same plane. These are arranged, however, as two separate surfaces, which are distanced apart along the longitudinal direction 18 of the cutting insert 12. The first lateral holder contact surface 40a directly borders the cutting insert bore 32 and preferably completely surrounds this. The second lateral holder contact surface 40b preferably directly borders the second cutting insert bore 34 and preferably completely surrounds this second cutting insert bore 34.

The axial holder contact surface 42 runs preferably orthogonally to the first and the second lateral holder contact surface 40a, 40b. It forms with the longitudinal direction 18 of the cutting insert 12 an acute angle, which preferably amounts to 45°.

The first horizontal holder contact surface 44a and the second horizontal holder contact surface 44b likewise run preferably orthogonally to the lateral holder contact surfaces 40a, 40b. They run preferably parallel to the cutting insert bores 32, 34, and substantially parallel to the cutting insert longitudinal direction 18. In much the same way as with the lateral holder contact surfaces 40a, 40b, the horizontal holder contact surfaces 44a, 44b each comprise separate surfaces, which are distanced apart in in the cutting insert longitudinal direction 18.

Preferably, the second horizontal holder contact surface 44b lies in the same plane with the first horizontal holder contact surface 44a. In practice, however, the two horizontal holder contact surfaces 44a, 44b do not run exactly parallel to each other and to the cutting insert longitudinal direction 18, since these two surfaces are unable to be produced, 'as sintered', exactly horizontally. According to a preferred embodiment, the two horizontal holder contact surfaces are therefore inclined by 0°-3° relative to the cutting insert longitudinal direction 18. However, the surfaces should only be inclined such that the distance between the two horizontal contact surfaces as a result of the inclination is not less than, but only greater than compared to exactly horizontal surfaces.

Said five contact surfaces 40a, 40b, 42, 44a, 44b, which are all arranged on the elevation 30 of the cutting insert 12, are preferably respectively arranged as planar surfaces.

Figure 4:
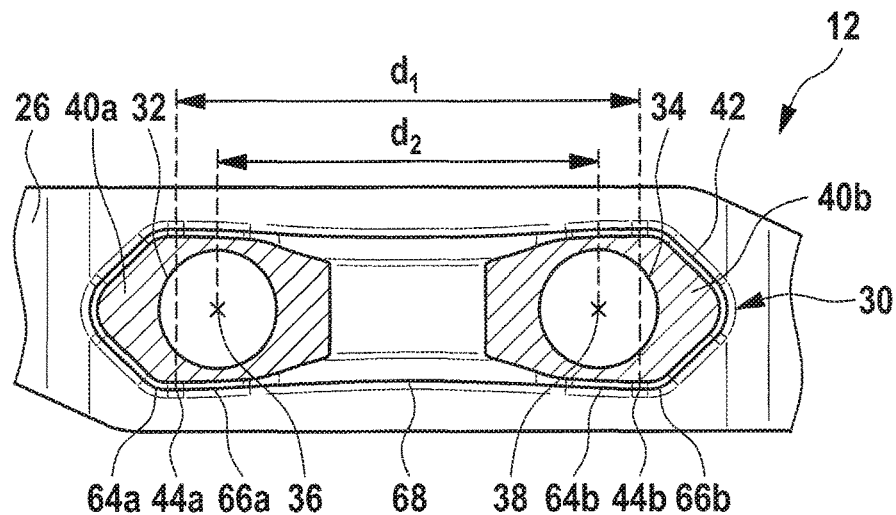
FIG. 4 shows a first side view of a middle region of a cutting insert according to the first embodiment of the tool.
Figure 5:
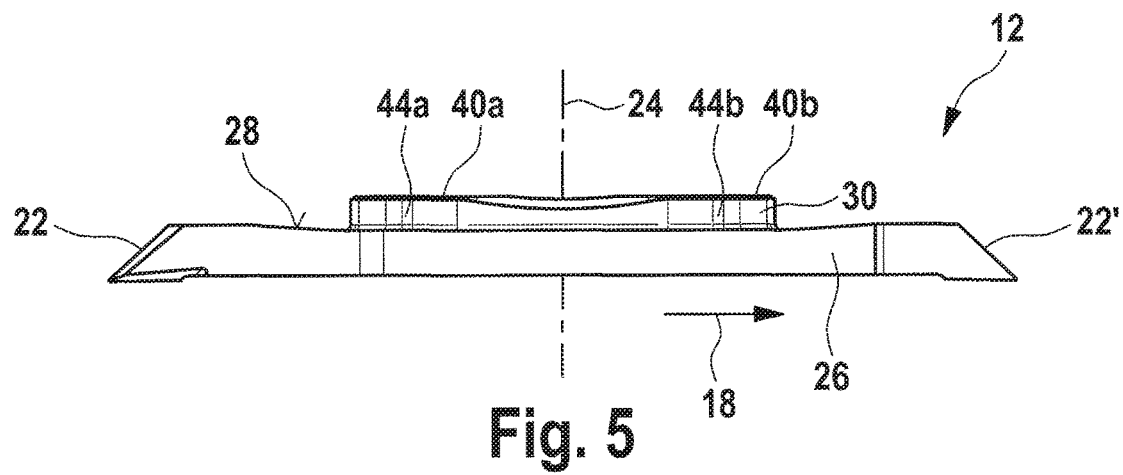
FIG. 5 shows a second side view of the entire cutting insert according to the first embodiment of the tool.
Figure 8:
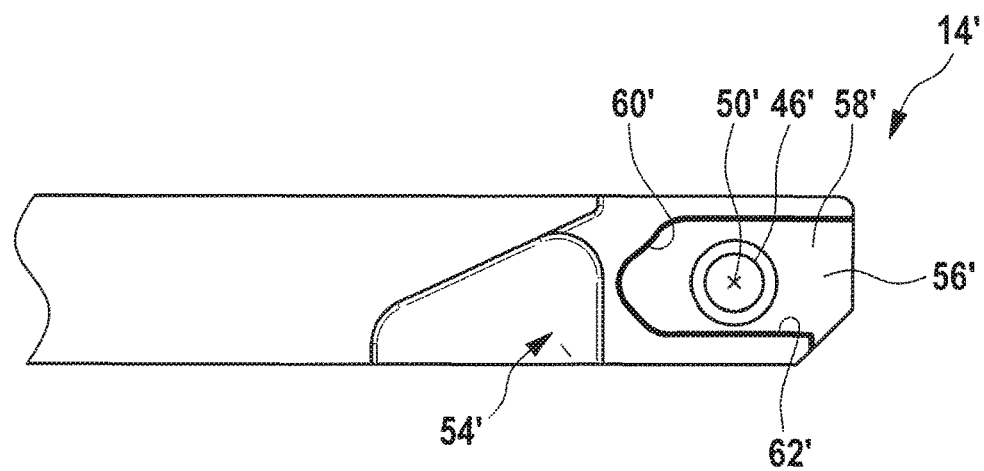
FIG. 8 shows a side view of the front end of the tool holder according to the second embodiment of the tool.
Figure 9:
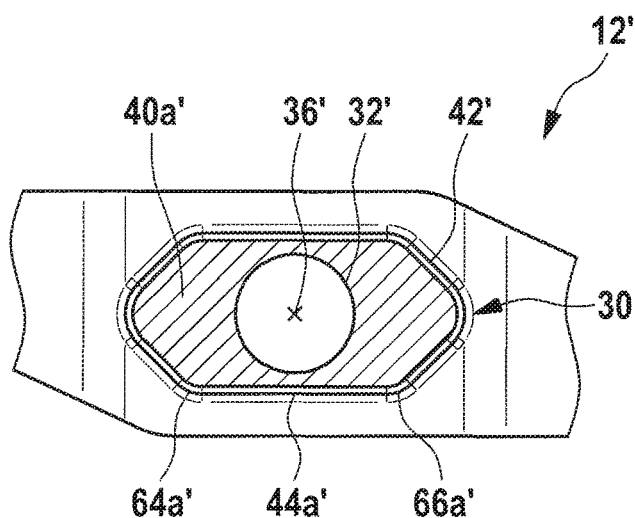
FIG. 9 shows a first side view of the middle region of the cutting insert according to the second embodiment of the tool.

It is to be understood that, due to the above-described rotational symmetry of the cutting insert 12 on the elevation 30, not only does the axial holder contact surface 42 illustrated in FIG. 4 on the right-hand side exist, but, correspondingly thereto, on the diagonally opposite side of the elevation 30, yet another axial holder contact surface (unnumbered) exists. Similarly, in addition to the horizontal holder contact surfaces 44a, 44b identified in FIG. 4 on the bottom side of the elevation 30, on the opposite top side of the elevation 30 also two further, here unnumbered, horizontal holder contact surfaces exist. The nature of the bearing contact of the cutting insert 12 against the tool holder 14 is therefore the same, regardless of which of the two cutting edges 22, 22' is employed. In both cases, the cutting insert 12 according to the first embodiment shown in FIGS. 1-5 bears with two horizontal holder contact surfaces 44a, 44b, an axial holder contact surface 42 and the two lateral holder contact surfaces 40a, 40b against the tool holder 14.

FIG. 3 shows in detail the corresponding interface on the tool holder 14. Like the cutting insert 12, the tool holder 14 also comprises two bores 46, 48. These are in the present case denoted as the first holder bore 46 and as the second holder bore 48. The first holder bore 46 extends along the third bore axis 50. The second holder bore 48 extends along a fourth bore axis 52. In the assembled state of the tool 10, the third bore axis 50 coincides with the first bore axis 36. Similarly, the fourth bore axis 52 and the second bore axis 38 then also coincide (cf. FIG. 2).

For the reception of the cutting insert 12, the tool holder 14 comprises a cutting insert receiving fixture 54 in the region of its front end. This cutting insert receiving fixture 54 is realized as a type of material cutout on the tool holder 14. Equivalently to the elevation 30 provided on the cutting insert 12, in the cutting insert receiving fixture 54 is provided a recess 56, which extends substantially along the holder longitudinal direction 20. The holder bores 46, 48 open out into the bottom of this recess 56.

Correspondingly to the holder contact surfaces 40, 42, 44 provided on the cutting insert 12, the recess 56 provided in the cutting insert receiving fixture 54 of the tool holder 14 comprises three contact surfaces 58, 60, 62. These three contact surfaces are referred to as a lateral cutting insert contact surface 58, as an axial cutting insert contact surface 60, and as a horizontal cutting insert contact surface 62. In the assembled state of the tool 10, the cutting insert 12 lies with its holder contact surface 40, 42, 44 on the contact surfaces 58, 60, 62 of the tool holder 14. At the same time, the two lateral holder contact surfaces 40a, 40b of the cutting insert 12 bear against the lateral cutting insert contact surface 58 of the tool holder 14. The axial holder contact surface 42 of the cutting insert 12 bears against the axial cutting insert contact surface 60 of the tool holder 14. The two horizontal holder contact surfaces 44a, 44b of the cutting insert 12 bear against the horizontal cutting insert contact surface 62 of the tool holder 14.

The lateral cutting insert contact surface 58 is preferably configured as a continuous, planar surface. Similarly, the horizontal cutting insert contact surface 62 is configured as a planar surface. By contrast, the axial cutting insert contact surface 60 is preferably configured as a convexly shaped surface. In the axial direction, a linear bearing contact is thus created between the axial holder contact surface 42 and the axial cutting insert contact surface 60. At the contact surface between the horizontal holder contact surfaces 44a, 44b and the horizontal cutting insert contact surface 62, a full-faced bearing contact, on the other hand, is respectively preferred. It is to be understood, however, that at this location too a linear bearing contact can materialize if the horizontal holder contact surfaces 44a, 44b, viewed in the cutting insert longitudinal direction 18, are chosen infinitesimally small or are slightly inclined (by maximally 3°) relative to the cutting insert longitudinal direction 18. Within the present patent, such embodiments shall continue to fall under the term horizontal holder contact surface, since they serve for the horizontal bearing contact of the cutting insert.

In order to produce a horizontal bearing contact which is as exact as possible, the horizontal holder contact surfaces 44a, 44b have in any case a relatively small width, measured in the cutting insert longitudinal direction 18. Both horizontal holder contact surfaces 44a, 44b, at their two ends lying opposite each other in the cutting insert longitudinal direction, respectively border a convexly shaped surface 64a, 64b, 66a, 66b (cf. FIG. 4). Between the two horizontal holder contact surfaces 44a, 44b is additionally provided, according to the first embodiment, a concavely shaped surface 68. The horizontal bearing contact of the cutting insert 12 is thus actually realized solely against the two horizontal holder contact surfaces 44a, 44b.

In order to avoid tilting of the cutting insert 12 about the transverse axis 24 during the tightening of the fastening means 16, but also to increase the stability and precision of the horizontal bearing contact of the cutting insert 12, the distance between the two horizontal holder contact surfaces 44a, 44b is preferably chosen relatively large. This distance is in FIG. 4 referred to as the first distance $d_1$. The distance $d_1$ is preferably chosen greater than a second distance $d_2$ which the bore axes 36, 38 have from each other.

FIG. 6-10 show a second embodiment of the tool 10 according to the invention. Equivalent advantages and features are therein denoted with the same reference numerals as before, yet additionally provided with a hyphen (for example 10' instead of 10). Since the basic idea, also in this second embodiment, is the same as in the first embodiment previously explained in detail, merely the differences between the two embodiments are examined below. The basic structure of the cutting insert 12' and of the tool holder 14' is not explained all over again. The abovementioned shall here apply equivalently.

As can be seen by comparing FIGS. 1-5 with FIGS. 6-10, the principle of providing the contact surfaces of the cutting insert 12' on the elevation 30' and providing the contact surfaces of the tool holder 14' in the recess 56' is realized equivalently also in the second embodiment. Here too, the cutting insert 12, in the assembled state of the tool 10', bears against the tool holder 14' merely with the contact surfaces provided on the elevation 30'. A contact between cutting insert 12' and tool holder 14' is thus established, also according to the second embodiment, merely between the elevation 30' and the recess 56'.

In contrast to the first embodiment shown in FIGS. 1-5, the elevation 30', in the cutting insert longitudinal direction 18, is constructed shorter, however. The cutting insert 12' comprises only one bore 32'. Equivalently thereto, the tool holder 14' also comprises only one bore 46'. The first cutting insert bore 32' extends along the first bore axis 36'. The first holder bore 46' extends along the third bore axis 50'. In the assembled state of the tool 10', the first bore axis 36' and the third bore axis 50' in turn coincide (cf. FIG. 7).

Instead of two lateral holder contact surfaces, according to the second embodiment only one lateral holder contact surface 40a' is provided. Similarly, also only one horizontal holder contact surface 44a' is provided. In much the same way as according to the first embodiment, this borders, at its two opposite ends, respectively a convexly shaped surface 64a' and 66a'. In the horizontal direction, the cutting inserts 12, 12', according to two embodiments, have merely an axial holder contact surface 42 or 42'. The arrangement and orientation of these holder contact surfaces 40a', 42', 44a' are chosen, however, equivalent to the arrangement and orientation of the holder contact surfaces 40a, 42, 44a according to the first embodiment.

Fewer changes between the first and second embodiment arise for the cutting insert receiving fixture 54' provided on the tool holder 14'e. Here too, the recess 56' comprises a preferably continuous, planar lateral cutting insert contact surface 58'. Similarly, in the recess 46' is provided a preferably convexly shaped axial cutting insert contact surface 60'. Also the horizontal bearing contact is preferably ensured with the aid of a continuous, planar horizontal cutting insert contact surface 62'.

In addition to the very stable and exact positioning of the cutting insert 12 or 12' on the tool holder 14 or 14', according to both embodiments the advantage is obtained that the cutting insert 12 or 12', despite relatively small dimensions of the tool holder 14 or 14', can be comparatively large. Due to the fact that the connection between cutting insert 12 or 12' and tool holder 14 or 14' is realized merely by the interaction of the elevation 30 or 30' with the recess 56 or 56', the cutting insert 12 or 12' can have a similar or even same height as the tool holder 14 or 14'. By "height" is here meant the dimension orthogonally to the longitudinal directions 18, 20, and orthogonally to the bore axes 36, 38, 50, 52. If the tool holder 14 or 14' is constructed very small for specific applications, thus has a cross-sectional size of 6×6 mm, for example, the cutting insert 12 or 12' can nevertheless have a height of 6 mm, for instance.

Figure 10:
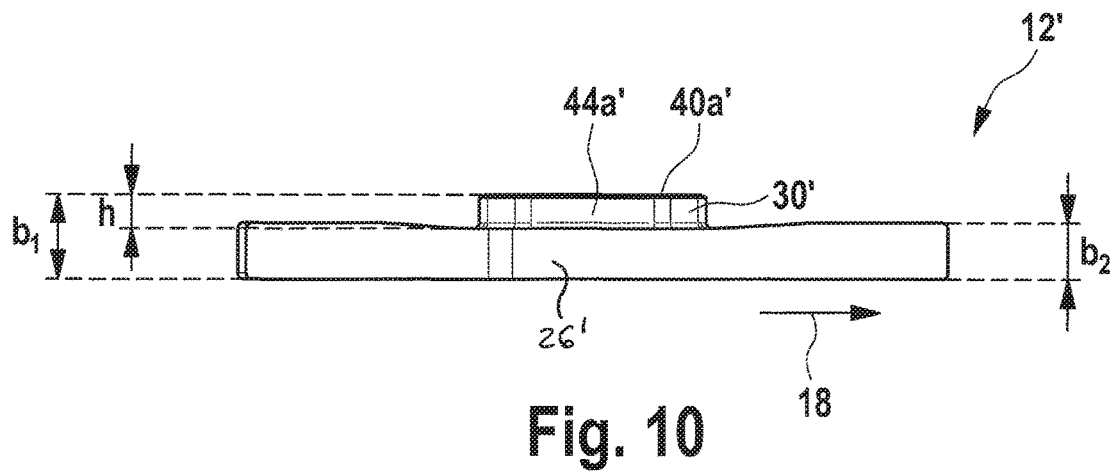
FIG. 10 shows a second side view of the entire cutting insert according to the second embodiment of the tool.

As can further be seen from FIG. 10, the cutting insert 12' has a total width $b_1$, measured parallel to the first bore axis 36, which is less than the sum of the width $b_2$, measured parallel to the first bore axis 36, of the first cutting edge 22, and a height h, measured parallel to the first bore axis 36, of the elevation 30'. Thus: $b_2 + h > b_1$. The same also applies to the cutting insert 12 according to the first embodiment. The main body 26 or 26' of the cutting insert 12 or 12' is thus configured wider in the region of the first cutting edge 22 than in that middle region of the main body 26 or 26' on which the elevation 30 or 30' is arranged. The elevation 30 or 30' can thereby be constructed taller, while the total width $b_1$ of the cutting insert remains the same. This, in turn, enables larger contact surfaces 40, 42, 44 which are arranged on the elevation 30.

What is claimed is:

1. A cutting insert for a tool for machining a workpiece, comprising a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, a second lateral holder contact surface, an axial holder contact surface and a first horizontal holder contact surface, for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis and completely surrounds the first cutting insert bore, and wherein the second lateral holder contact surface lies in a same plane with the first lateral holder contact surface, is distanced from the first lateral holder contact surface in the cutting insert longitudinal direction and completely surrounds the second cutting insert bore, and wherein the axial holder contact surface and the first horizontal holder contact surface run substantially orthogonally to the first lateral holder contact surface and transversely to each other.

2. The cutting insert as claimed in claim 1, wherein both the first lateral holder contact surface and the second lateral holder contact surface are ground surfaces, and wherein both the axial holder contact surface and the first horizontal holder contact surface are sintered and unpolished surfaces.

3. The cutting insert as claimed in claim 1, wherein the axial holder contact surface and the first horizontal holder contact surface form between them an acute angle.

4. The cutting insert as claimed in claim 1, wherein the cutting insert has a width, measured parallel to the first bore axis and the second bore axis, which is less than the sum of a width, measured parallel to the first bore axis and the second bore axis, of the first cutting edge and a height, measured parallel to the first bore axis and the second bore axis, of the elevation.

5. The cutting insert as claimed in claim 1, wherein on the elevation is further arranged a second horizontal holder contact surface, which is distanced from the first horizontal holder contact surface in the cutting insert longitudinal direction.

6. The cutting insert as claimed in claim 5, wherein a first distance, measured in the cutting insert longitudinal direction, between the first horizontal holder contact surface and the second horizontal holder contact surface is greater than a second distance, measured in the cutting insert longitudinal direction, between the first bore axis and the second bore axis.

7. The cutting insert as claimed in claim 1, wherein the first horizontal holder contact surface borders at a first end a first convexly shaped surface arranged on the elevation, and at second end, which is opposite the first end, a second convexly shaped surface arranged on the elevation.

8. The cutting insert as claimed in claim 5, wherein on the elevation is further provided a concavely shaped surface, which is arranged, in the cutting insert longitudinal direction, between the first horizontal holder contact surface and the second horizontal holder contact surface.

9. The cutting insert as claimed in claim 1, wherein a width, measured orthogonally to the first bore axis and the second bore axis and orthogonally to the cutting insert longitudinal direction, of the elevation is less than a height, measured orthogonally to the first bore axis and the second bore axis and orthogonally to the cutting insert longitudinal direction, of the cutting insert.

10. A tool for machining a workpiece, comprising:
a cutting insert having a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact sur-face, a second lateral holder contact surface, an axial holder contact surface and a first horizontal holder contact surface, for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis and completely surrounds the first cutting insert bore, and wherein the second lateral holder contact surface lies in a same plane with the first lateral holder contact surface, is distanced from the first lateral holder contact surface in the cutting insert longitudinal direction and completely surrounds the second cutting insert bore, and wherein the axial holder contact surface and the first horizontal holder contact surface run substantially orthogonally to the first lateral holder contact surface and transversely to each other;

the tool holder comprising a cutting insert receiving fixture for receiving the cutting insert;

a first screw inserted through the first cutting insert bore into the tool holder; and a second screw inserted through the second cutting insert bore into the tool holder.

11. The tool as claimed in claim 10, wherein the cutting insert and the tool holder bear one against the other solely with the elevation arranged on the cutting insert and with a recess provided in the cutting insert receiving fixture of the tool holder.

12. A cutting insert for a tool for machining a workpiece, comprising a first cutting edge, a first cutting insert bore and a second cutting insert bore,
wherein the cutting insert has an elongate shape and extends along a cutting insert longitudinal direction,
wherein the first cutting insert bore extends along a first bore axis, which runs substantially orthogonally to the cutting insert longitudinal direction,
wherein the second cutting insert bore extends along a second bore axis which is oriented parallel to the first bore axis,
wherein the cutting insert further comprises a laterally protruding elevation, which is arranged on a side of the cutting insert that is oriented transversely to the first bore axis and the second bore axis, wherein on the elevation are arranged a first lateral holder contact surface, an axial holder contact surface, a first horizontal holder contact surface and a second horizontal holder contact surface for a bearing contact of the cutting insert against a tool holder, and wherein both the first cutting insert bore and the second cutting insert bore pass through the elevation,
wherein the first lateral holder contact surface runs substantially orthogonally to the first bore axis and the second bore axis,
wherein the axial holder contact surface and the first horizontal holder contact surface run substantially orthogonally to the first lateral holder contact surface and transversely to each other, wherein the second horizontal holder contact surface is distanced from the first horizontal holder contact surface in the cutting insert longitudinal direction, and wherein a first distance, measured in the cutting insert longitudinal direction, between the first horizontal holder contact surface and the second horizontal holder contact surface is greater than a second distance, measured in the cutting insert longitudinal direction, between the first bore axis and the second bore axis.

13. The cutting insert as claimed in claim 12, wherein the first lateral holder contact surface surrounds the first cutting insert bore.

14. The cutting insert as claimed in claim 12, wherein the first lateral holder contact surface is a ground surface, and wherein the axial holder contact surface, the first horizontal holder contact surface and the second horizontal holder contact surface are sintered and unpolished surfaces.

15. The cutting insert as claimed in claim 12, wherein the axial holder contact surface and the first horizontal holder contact surface form between them a first acute angle, and wherein the axial holder contact surface and the second horizontal holder contact surface form between them a second acute angle which is of same size as the first acute angle.

16. The cutting insert as claimed in claim 12, wherein the cutting insert has a width, measured parallel to the first bore axis and the second bore axis, which is less than the sum of a width, measured parallel to the first bore axis and the second bore axis, of the first cutting edge and a height, measured parallel to the first bore axis and the second bore axis, of the elevation.

17. The cutting insert as claimed in claim 12, wherein on the elevation is further arranged a second lateral holder contact surface, which lies in a same plane with the first lateral holder contact surface and is distanced from the first lateral holder contact surface in the cutting insert longitudinal direction, wherein the first lateral holder contact surface at least partially surrounds the first cutting insert bore, and wherein the second lateral holder contact surface at least partially surrounds the second cutting insert bore.

18. A tool for machining a workpiece, comprising:

a cutting insert having a first cutting edge, a first cutting insert bore and a second cutting insert bore, wherein the cutting insert has an elongate shape and extends along a cutting insert longitudinal direction, wherein the first cutting insert bore extends along a first bore axis, which runs substantially orthogonally to the cutting insert longitudinal direction, wherein the second cutting insert bore extends along a second bore axis which is oriented parallel to the first bore axis, wherein the cutting insert further comprises a laterally protruding elevation, which is arranged on a side of the cutting insert that is oriented transversely to the first bore axis and the second bore axis, wherein on the elevation are arranged a first lateral holder contact surface, an axial holder contact surface, a first horizontal holder contact surface and a second horizontal holder contact surface for a bearing contact of the cutting insert against a tool holder, and wherein both the first cutting insert bore and the second cutting insert bore pass through the elevation, wherein the first lateral holder contact surface runs substantially orthogonally to the first bore axis and the second bore axis, wherein the axial holder contact surface and the first horizontal holder contact surface run substantially orthogonally to the first lateral holder contact surface and transversely to each other, wherein the second horizontal holder contact surface is distanced from the first horizontal holder contact surface in the cutting insert longitudinal direction, and wherein a first distance, measured in the cutting insert longitudinal direction, between the first horizontal holder contact surface and the second horizontal holder contact surface is greater than a second distance, measured in the cutting insert longitudinal direction, between the first bore axis and the second bore axis;

the tool holder comprising a cutting insert receiving fixture for receiving the cutting insert;

a first screw inserted through the first cutting insert bore into the tool holder; and a second screw inserted through the second cutting insert bore into the tool holder.

19. The tool as claimed in claim 18, wherein the cutting insert and the tool holder bear one against the other solely with the elevation arranged on the cutting insert and with a recess provided in the cutting insert receiving fixture of the tool holder.

* * * * *